(12) United States Patent
Enoyoshi et al.

(10) Patent No.: US 6,525,433 B1
(45) Date of Patent: Feb. 25, 2003

(54) METHOD OF PREVENTING CAR THEFTS

(75) Inventors: Masahiko Enoyoshi, Mori-machi (JP); Masayuki Yamamoto, Mori-machi (JP); Naoya Isoda, Mori-machi (JP)

(73) Assignee: Kabushiki Kaisha Moric, Mori (JP)

( * ) Notice: Subject to any disclaimer, the term of this patent is extended or adjusted under 35 U.S.C. 154(b) by 0 days.

(21) Appl. No.: 09/635,304

(22) Filed: Aug. 9, 2000

(30) Foreign Application Priority Data

Sep. 3, 1999 (JP) ............................................ 11-250842

(51) Int. Cl.[7] .............................................. H01H 47/00
(52) U.S. Cl. .................. 307/10.5; 307/9.1; 307/10.2; 307/10.3; 340/825.34; 180/287
(58) Field of Search .................. 307/10.5, 9.1, 307/10.2, 10.3; 340/825.34; 180/287

(56) References Cited

U.S. PATENT DOCUMENTS 6,133,649 A * 10/2000 Iwamoto et al. ........... 307/10.5
6,160,488 A * 12/2000 Honda .................... 340/825.34

* cited by examiner

*Primary Examiner*—Stephen W. Jackson
*Assistant Examiner*—Robert L DeBeradinis
(74) *Attorney, Agent, or Firm*—Ernest A. Beutler (57) ABSTRACT

A method and apparatus of vehicle theft prevention, which utilizes a key having a transponder bearing an ID and a key cylinder, that is adapted to receive this key and which has an antenna for supplying electrical power to the transponder and receiving an ID signal back from it. This system permits easy correction of incorrectly set original IDs or the simple substitution of a new key or an old master key as a new master key into a vehicle wherein the lock cylinder must be replaced due to a defect.

10 Claims, 9 Drawing Sheets

IN ORDINARY USE

○ : Turned ON
☆ : Flashing (slow ... 2-sec intervals)
◎ : Flashing (fast ... 1-sec intervals)
● : Tuned OFF
Numeral on the right side shows frequency

DETAIL OF OPERATING CONDITIONS AND DECRIPTION OF OPERATIONS

| FUNCTIONS | OPERATING CONDITIONS | DESCRIPTION OF OPERATIONS |
|---|---|---|
| Clearing of all ID codes | - All-clear key is inserted within 10 sec after main switch is turned OFF with master key.<br>- When result of comparison is N.G., all-clea key or master key is inserted within 10 sec after switching OFF. | Erase all the IDs of master key and sub-keys registered. |
| Clearing of sub-key ID | Master switch is turned ON with key registered as master key | Erase all the IDs of sub-keys registered. |
| Registration of master key ID | When no IDs have been registered, main switch is turned ON with key having built-in transponder. | Register ID of a key with which main switch is turned ON, as ID of master key. |
| Registration of sub-key ID | 1. Upon ID of sub-key being cleared with master key, main switch is turned ON with another key having built-in transponder within 10 sec after main switch is turned OFF. | Register ID of a key underlined on the left side frame, as ID of first sub-key. |
| | 2. Upon operation 1 being done, main switch is turned ON with another key having built-in transponder within 10 sec after main switch is turned OFF. | Register ID of a key underlined on the left side frame, as ID of second sub-key. |
| | 3. Upon main switch being turned ON with only one sub-key that has been registered, main switch is turned ON with another key having built-in transponder within 10 sec after main switch is turned OFF. | Register ID of a key underlined on the left side frame, as ID of second sub-key. |
| Determination of whether ignition allowed or prohibited as a result of comparison of IDs | Main switch is turned ON. | After reading ID of inserted key and comparison of ID of the inserted key with registered IDs, if the ID of the key coincides with any one of registered IDs, ignition is allowed.<br>After continuous 5 sec ID reading and comparison, if no coincidence occurs, ignition is not allowed. |

FIG. 8

| FUNCTION | OPERATING CONDITIONS | DESCRIPTION OF OPERATIONS |
|---|---|---|
| (6) Expressions of system operating states (the style of expressions is the same both in LCDs and LEDs) | 1. - Switching ON with registered sub-key (at the time of comparison). <br> - Second sub-key is registered. <br> *1: At the time of comparison, if the resuls is N.G. in the first communication act or registration is failed in three consecutive communication acts, the display section is lighted. | With LCD turned OFF (*1) |
| | 2. - Switching ON with unregistered sub-key. <br> - Switching on without transponder. | LCD turned ON for 5 sec. <br> → LCD flashed (fast: 1-sec intervals) <br> SW ON about 5 sec. <br> ON - <br> OFF - <br> 1 sec  5 sec  0.5 sec  0.5 sec |
| | 3. - Switching ON with master key. (both in registration of master key and erasion of sub-keys) | Approximately 1 sec after switching ON, LCD flashed for 9 sec (slow: 2-sec intervals) <br> → LCD turned OFF <br> SW ON  9 sec <br> ON - <br> OFF <br> 1 sec  flashed 5 times |
| | 4. - First sub-key is registered. | Approximately 1 sec after switching ON, LCD flashed for 9 sec (slow: 2-sec intervals) <br> → LCD turned OFF <br> SW ON  5 s <br> ON - <br> OFF <br> 1 sec  flashed 3 times |

FIG. 9

METHOD OF PREVENTING CAR THEFTS

BACKGROUND OF THE INVENTION

This invention relates to a method of preventing car thefts and more particularly to an improved method and apparatus for locking a motor vehicle.

Many motor vehicles now employ locking systems that include a key which is not only keyed to a tumbler but which also carries a built-in transponder which works with a receiver mounted on the vehicle and normally as a part of the locking mechanism so as to contain a specific ID code. When the key is inserted into the locked cylinder, the transponder transmits a signal to the device and its ID is checked. If the proper ID is not registered, then it is impossible for the user to start the engine even if the key can be turned in the lock cylinder and thus, thefts are prevented.

Although this system has obvious advantages, there are some disadvantages to it. That is, there are times when due to either replacement of the key or replacement of the lock or vehicle mounted portion; it is necessary to reset the lock so as to use a key with a new ID. The method that has been done previously is quite cumbersome and involves either installing a new key cylinder that matches the previously key utilized or replacement of the transponder on the key with a proper one for the new lock. Both methods are cumbersome and also result in poor appearance for the key if the key is attempted to be repaired with a new transponder.

Also, there are times when the wrong ID code may be initially registered in the locking device. When this occurs, a special mechanism is required in order to erase all of the registered ID codes and then new codes must be programmed in. This has been a cumbersome and costly procedure.

It is, therefore, a principal object to this invention to provide an improved and simplified method and apparatus for registering a new ID in a lock of the locking mechanism of the type described.

It is a further object of this invention to provide an improved and simplified method and apparatus by which a lock of this type can have its memory erased and new ID numbers programmed into it.

It should be apparent that the mere ability to erase the IDs' and program new IDs' in place, presents a possibility of reduced protection from theft. However, in accordance with a further feature of the invention, the mechanism and method is designed so that only a specific pre-identified ID key can be utilized to erase the ID indications from the memory and place new IDs in it.

It is a further object to the invention to provide an improved method for operating a lock of this type and a lock that permits re-registration of IDs by authorized persons to provide theft protection and simplify correction of changing in either the key, the lock or correction of mistaken entries.

SUMMARY OF THE INVENTION

This invention is adapted to be embodied in a method of preventing vehicle thefts and key locking system for a vehicle that comprises a key cylinder and controller that are mounted on the vehicle and a key which is insertable into the key cylinder for switching on a main switch for activating a prime mover of the vehicle. The key has a built-in transponder containing an ID code of the key to be sensed when the key is inserted into the key cylinder by the controller.

In accordance with a method for performing the invention, the method comprises the steps of permitting the operation of the prime mover only when the ID code detected by the transponder coincides with an ID code, which has been registered in the controller. The controller is conditioned to memorize an ID code of a newly recognized key by inserting a key having a specific ID code into the key cylinder to turn the main switch on and withdrawing the key having the specific ID code without starting the prime mover. Thereafter, the ID code of the newly recognized key is memorized if inserted into the key cylinder within a predetermined time after the key having the specific ID code has been withdrawn.

In accordance with a key locking system of the type described, the controller is conditioned so as to recognize and memorize the ID code of a newly registered key if inserted into the key cylinder at a predetermined time after a previously registered key has been inserted into the key cylinder, the main switch turned on and the registered key withdrawn.

BRIEF DESCRIPTION OF THE DRAWINGS

FIGS. 8 and 9 are a table showing how the various operating conditions and description of their operation are followed in accordance with the invention.

DETAILED DESCRIPTION OF THE PREFERRED EMBODIMENTS OF THE INVENTION

Figure 1:
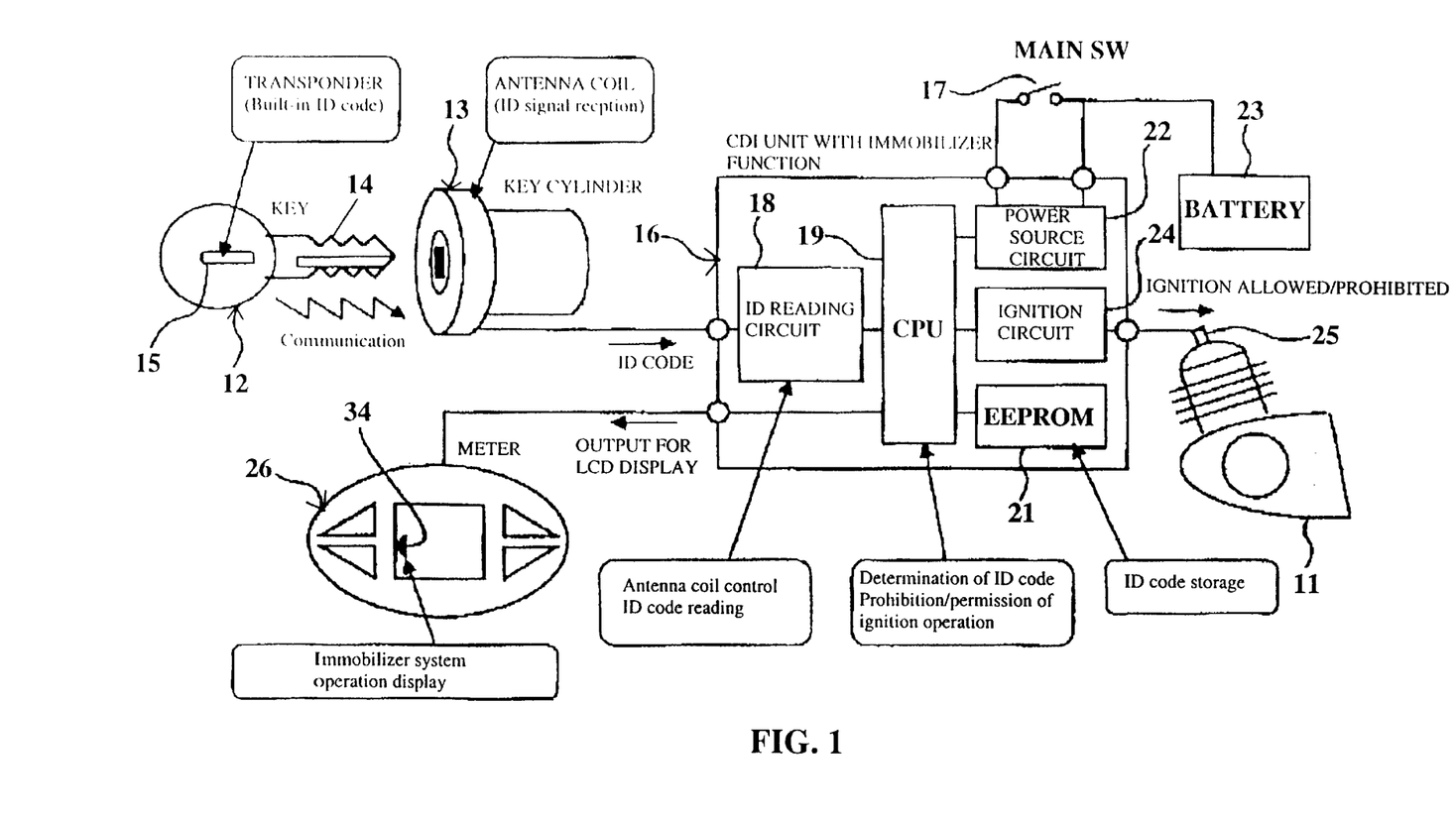
FIG. 1 is a partially schematic view showing the main components of a vehicle having a locking system operated and constructed in accordance with the invention.
Figure 2:
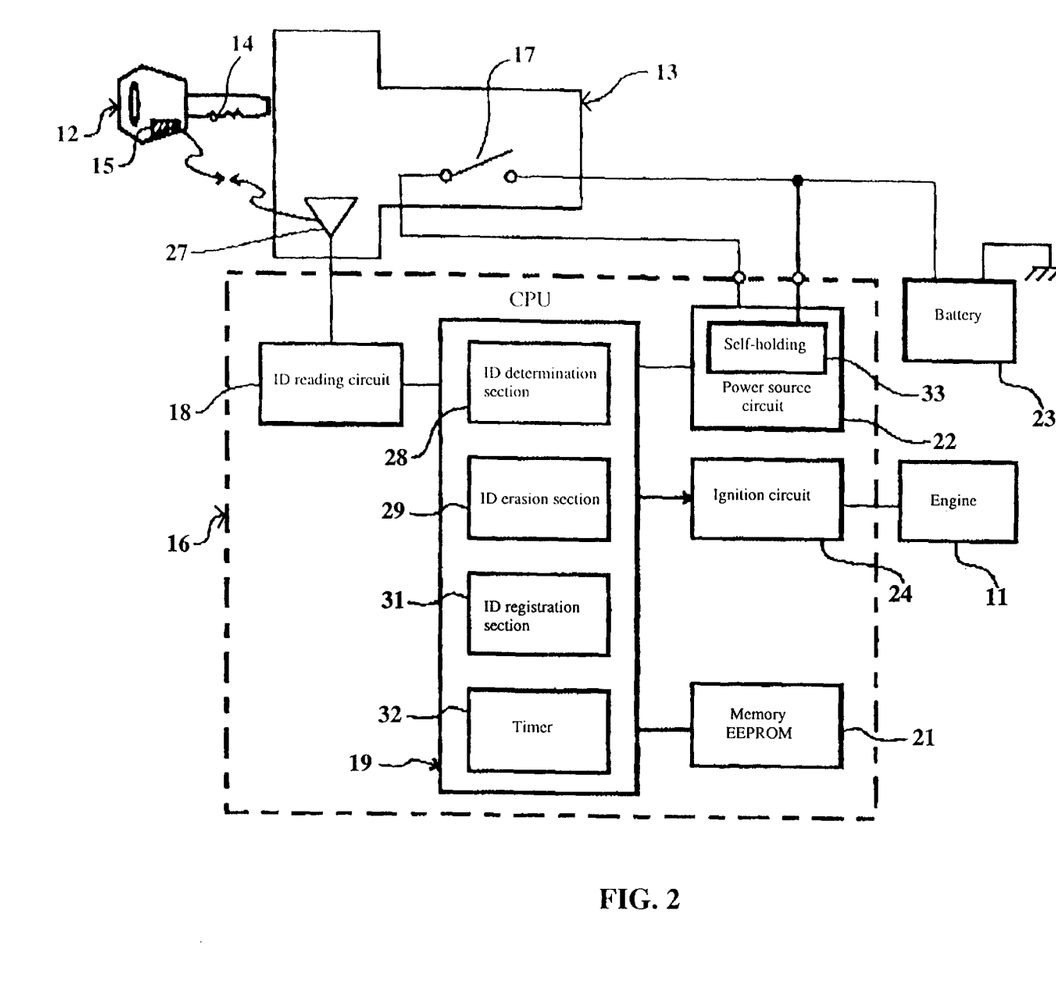
FIG. 2 is a view, in part similar to FIG. 1, but showing in more detail the relationship between the key, the key cylinder and the controller.

Referring now in detail to the drawings and initially to FIGS. 1 and 2, a key system incorporating the invention and operated in accordance with an embodiment of the invention is illustrated schematically in these figures. In FIG. 1, the system is shown schematically in combination with a vehicle which is powered by a prime mover which is depicted schematically as an internal combustion engine, indicated generally by the reference numeral 11 but can include other prime movers such as electric motors, fuel cells, etc. The vehicle may be a land vehicle such as a car or motorcycle or any other type of land, water of air vehicle.

Basically, the operation of the prime mover 11 is controlled under a function of a locking system which includes a key, indicated by the reference numeral 12, and a key cylinder, indicated generally by the reference numeral 13. The key 12 basically includes a normally keyed portion 14 and a base portion in which a transponder 15 is mounted that has a built in ID code. The latter description will describe a number of keys such as a master key, sub-keys, and an all clear key, which have certain functions and which are utilized in accordance with the invention to permit and simplify the resetting a new master or sub-key either when the master key is replaced or the key cylinder is replaced.

The key cylinder 13 in addition to having a normal tumbler section operated by the keying portion 14 of the key 12 also includes an ID signal reception device in the form of an antenna that sends and receives signals from the transponder 15 of the inserted key 12. This antenna then outputs its signal of the reading of the key ID code to a controller, indicted generally by the reference numeral 16, and which has a number of associated components including. One of these components is associated with a main switch 17 that is operated by the key cylinder 13 upon the turning of the appropriate key therein in manners which will be described.

The ID code is transmitted from the antenna coil of the key cylinder 13 to an ID reading circuit, indicated by the reference numeral 18, which outputs its signal to a CPU unit 19. The CPU unit 19 determines the results of the comparison of the ID code of the inserted key with certain codes that have been memorized and other functions as set forth hereinafter.

The CPU 19 also receives information from an Electronically Erasable Programmable Read Only Memory (EEPROM) indicated by the reference numeral 21, which stores certain ID codes in a manner, which will be described. Based upon the functioning of the rotation of the key 12 in the key cylinder 13, a power source circuit 22 is turned on to permit the main switch 17 to be activated and transmit a source of electrical power from a battery 23 to the controller 16.

This also permits a signal to be sent from the CPU 19 to an ignition circuit 24 if the appropriate key has been utilized so as to permit energerization of a spark plug 25 of the engine 11. If an electrical motor is utilized as the prime mover, the ignition circuit 24 will comprise a switch for transmitting electrical power to the electric motor for its operation, for example by way of a pulse width modulation device, as a way of example.

Additionally, the device may include a display section 26 that is mounted in an appropriate position on the associated vehicle for viewing by the operator and which displays certain information, as will become hereinafter described. These may comprise vehicle operating conditions such as speed and/or security conditions.

Referring now to FIG. 2, this figure shows in more detail the units associated with the CPU and the controllers for controlling the operation of the prime mover 11. The antenna of the key cylinder 13 appears in this figure and is identified by the reference numeral 27, which, as aforenoted, outputs its signal to the ID reading circuit 18 of the controller 16. This output is then transmitted to the CPU 19 which includes an ID determination circuit 28 which decodes the ID signal from the transponder 15 to the antenna 27, an ID erasing section 29 which functions to erase all ID's from the volatile memory of the CPU 19, an ID registration section 31 which establishes a new ID registrations as recognized and approved IDs and an timer section 32, for a purpose which will be described.

The power source circuit 22 includes a self-holding section 33, which maintains the power source on after the key operated main switch 17 is closed and then reopened after a predetermined time interval. As seen in this figure, the main switch 17 may be actually incorporated physically in the key cylinder 13.

The EEPROM 21 is indicated at the memory in this figure.

It should be noted that the ignition circuit 24 includes not only a device for permitting the operation of the prime mover 11 to be initiated assuming the right key is inserted and switched on, but also has the function of prohibiting starting or operation of the prime mover 11 if the appropriate key has not been inserted and turned.

Figure 3:
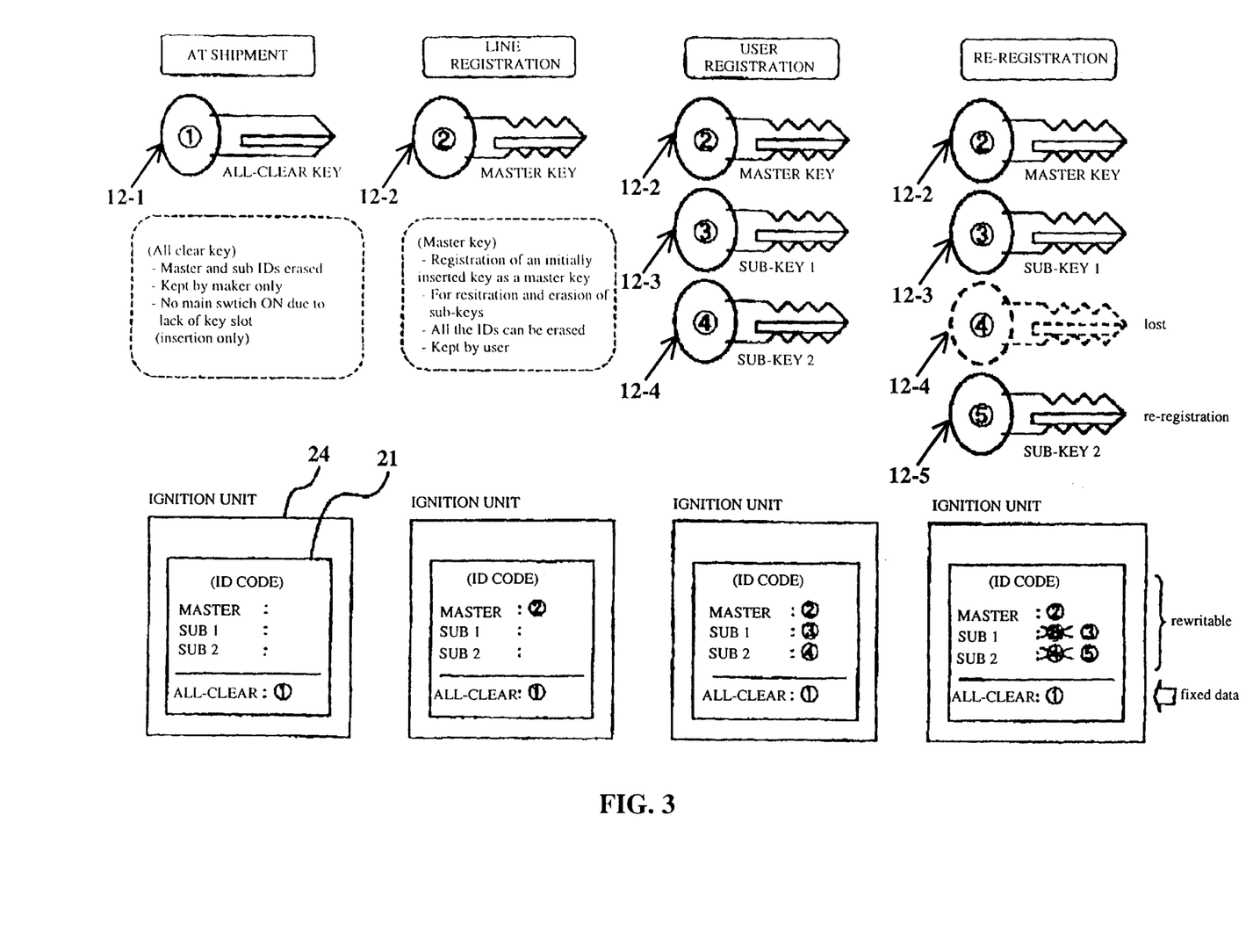
FIG. 3 is a view showing the flow routine and association with the various keys used in the system illustrating how the mechanism is originally set at the factory and how a new registration of keys can be accomplished.

Referring now to FIG. 3, this shows the various types of keys which are employed and the way in which they function both during initial registration of a master key and user registration of sub-keys as well as re-registration in the event a key is lost or in the event the key cylinder 13 is replaced or a new master key must be utilized for any reason.

It has been previously mentioned that there are all clear keys, master keys and sub-keys and each of these is shown with the all clear key being indicated by the reference numeral 12-1. This master key has a transponder but is not keyed so that it will not be able to turn in the key cylinder 13. A line registration master key 12-2 is also provided that in this embodiment, serves the function of both being capable of registered as a master key and also can be used for erasing or registering sub-keys. Also, this key can be utilized to erase all IDs upon lock replacement, as will be described. This key is keyed as at 14 so that it can be rotated in the key cylinder 13 in a manner, which will be described.

The user registration keys include the master key 12-2 as previously described and two sub-keys (1 & 2) indicated at 12-3 and 12-4. These keys 12-2, 12-3 and 12-4 all have the same key sections 14 but have different IDs in their respective transponders. Also, the sub-keys 12-3 and 12-4 do not have the capability of erasing data.

The last portion of the upper part of this figure when proceeding from left to right, shows a situation where there is a re-registration of a key which has been lost and this lost key is the sub-key 12-4 and replaced by a new sub-key 12-5. The sub-key 12-5 is like all other sub-keys in its functioning and as previously described.

Now referring to the bottom portion of this figure, the ignition unit memory is shown which includes, as noted in FIG. 2, the main ignition unit 24 and the memory section 21 that includes the EEPROM having the re-writable section and a fixed non-erasable section. The function of the all clear key is to clear all of the master and sub IDs maintained and this is operated by merely inserting the all clear key 12-1 into the ignition key cylinder 13. When this is done, all of the erasable memory erased while the all clear fixed data is maintained in place.

The master key 12-2 is intended to be the master key retained by the owned and its insertion into the key cylinder 13 in the manner, which will be described hereinafter, causes the master key code to be memorized in the re-writable memory.

Then, after this key has been inserted, then the sub-keys 1 and 2 (12-3 and 12-4) are inserted into the key cylinder 13 in the manner, which will be described, these keys are registered in the re-writable memory.

In the re-registration of a key, which may be done after a key is lost, the master key is first inserted so to clear the memory of the previously registered sub-keys and then all sub-keys to be used can be registered. This will include re-registration of the sub-key 1 (12-3) and registration of a new sub-key 2 (12-5).

Figure 4:
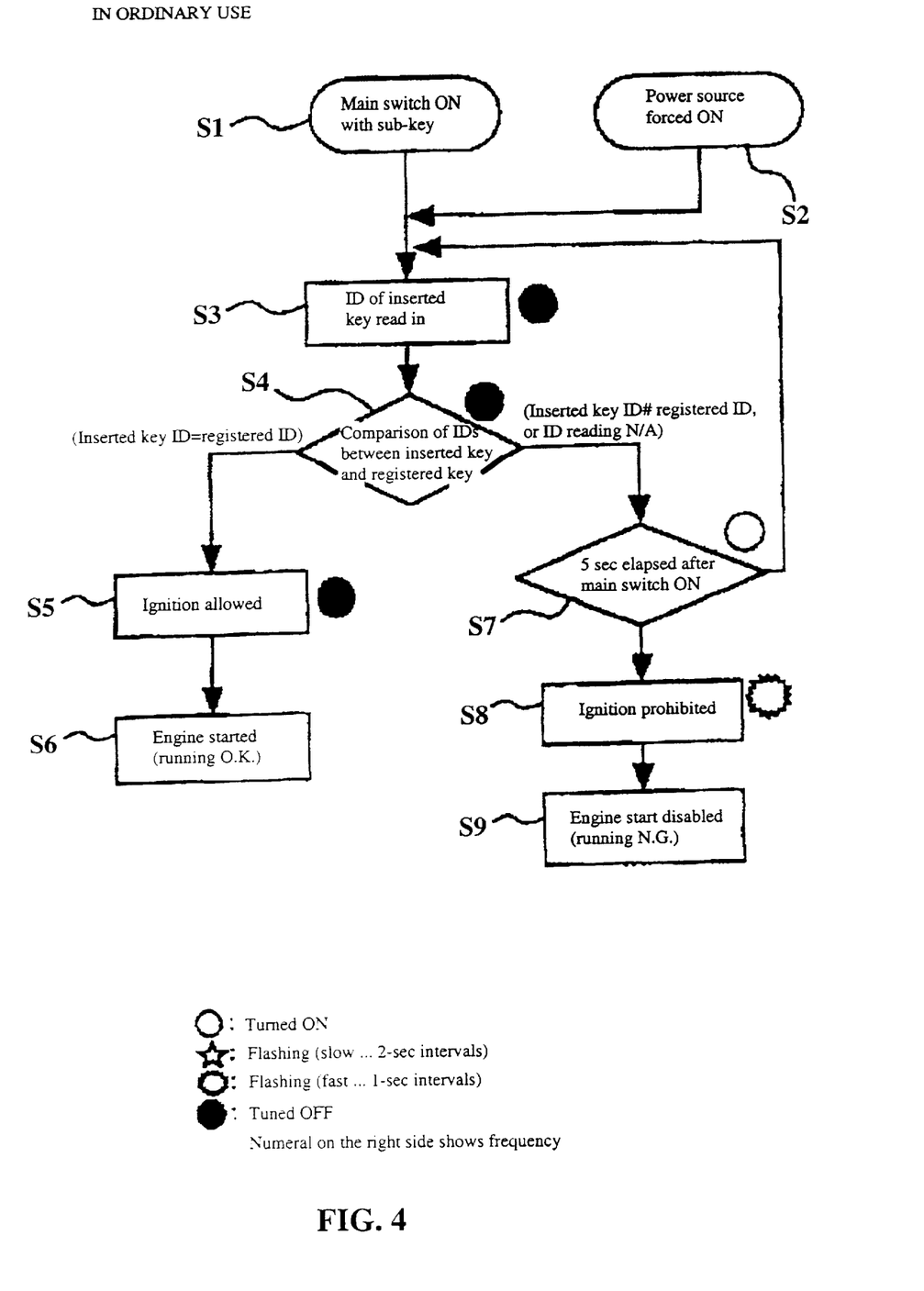
FIG. 4 is a flow diagram showing the operation in accordance with normal ordinary use.

The various control routines will now be described starting with FIG. 4, which depicts the operation in ordinary use.

It is assumed that the operator or owned of the vehicle will maintain the main key separately and will use one of the sub-keys for normal operation. Thus, the operation is as follows in that at the step S1, the main switch is switched on with a sub-key such as the sub-key 12-2 or 12-3. When this is done, the power source circuit 22 is energized at S2 and outputs electrically energy to the ID reading circuit 18 and the antenna of the key cylinder 13. The transponder is then energized and outputs its ID code, which is compared with the registered ID codes in the CPU 19 at the step S3. Then the comparison is made at the step S4 and if the inserted key has a registered key, then ignition is allowed by the ignition circuit 24 at the step S5 and the engine is started at the step S6 so as to be running. At this time the immobilizer section 34 of the display 26 (FIG. 1) is not activated or illuminated.

If, however, at the step S4 it is determined that the inserted key number is not equal to a registered key number or it is not possible to read an ID of the inserted key, within 5 seconds after the switch is turned on, the program at the step S7 determines if this time limit has expired. If it has not, the program repeats and the immobilizer section 34 of the display 26 is constantly illuminated.

If, however, the time of 5 seconds has elapsed, and the significance of this time will become apparent later, then the program moves to the step S8 where ignition is prohibited and the step S9 where engine starting is disabled and the immobilizer display is flashed for a short time such as one second. Thus, in normal operation the system makes a comparison to confirm that the inserted and switched key is a registered key and if so, ignition and prime mover operation is initiated. If not within a predetermined time period such as the 5-second example given, it is impossible to start the prime mover 11 and the operator is warned.

Figure 5:
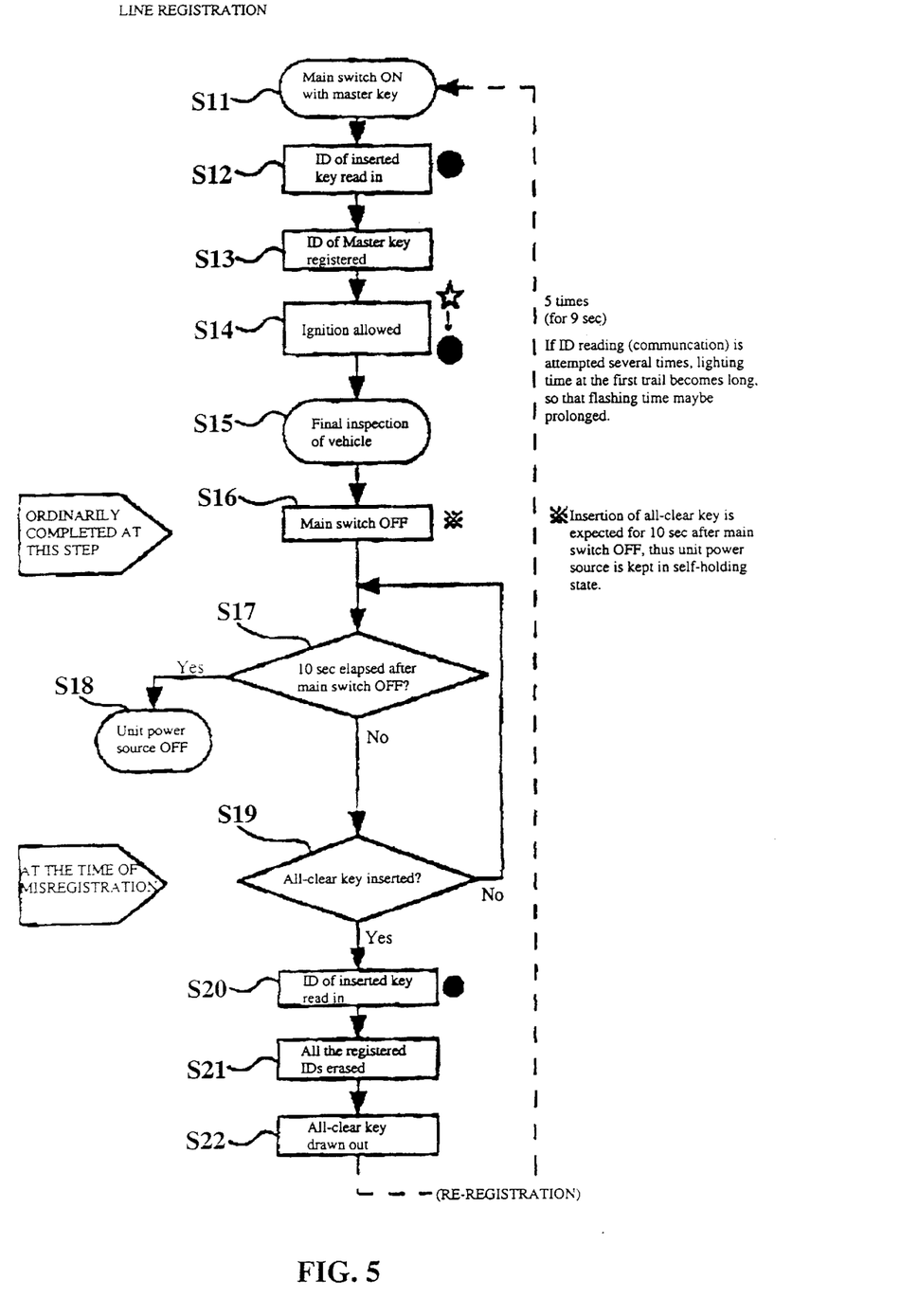
FIG. 5 is a flow diagram showing how the registration of a master key is accomplished in accordance with the normal registration practice as well as the resetting of the master key.

FIG. 5 shows the control routine when the new master key is programmed in at the factory as indicated in the second view of FIG. 3 or when a re-registration occurs at shown in the right hand of this figure.

The first portion of the routine is the line registration of a new vehicle and it begins at the step S11 where the main switch is turned on with a master key. This is done after the all-clear key has been inserted and removed as noted in discussing the routine of FIG. 3. When this master key 12-2 is placed into the key cylinder 13 and the master switch is turned on, at the step S12, the ID of the new key is read in by the ID reading circuit. The display 34 is not illuminated at this time.

At this time, the master data registers this new key in the EEPROM 21 and specifically in the fixed memory thereof at the step S13. Then, ignition or starting of the prime mover is enabled at the step S14. It may be that ignition is not possible immediately and several re-registrations may be made This is in part due to the necessity to initially charge the transponder 15 of the master key. Thus the display 34 is flashed slowly until registration is completed and then the display 34 is turned off.

Then the main switch is turned off at the step S16 and this generally completes the original registration. However, there is a brief time delay when the holding circuit 33 (FIG. 22) maintains the supply of power. This is done for a period of time such as 10 seconds after the main switch is turned off. Thus, the unit power source is kept in a holding state. However, this time normally runs out under initial registration without any further registration.

If, however, it is desired to register a new key, then after the main switch is turned off at the step S16 and the program moves to the step 17 to run the timer and determine if the 10-second time delay has elapsed. If it is, the program is shut off at the step S18 and no new registration can be made.

If, however, at the step S17 it is determined that the main switch is still on and the 10-second run has not yet ran, the program moves to the step S19 to initiate the possibility for a re-registration to correct a mis-registration of the wrong main key. This is just one example of when a mis-registration can be taken care of.

Then, at the step S19 if an all clear key such as the key 12-2 is inserted before the time of 10 seconds has ran out, the program moves to the step S20 so as to read the ID of the inserted key. If the ID of the inserted key is one that is pre-programmed into the fixed data, then at the step S21 all registered IDs are erased. The program then moves to the step S22 where the all clear key is drawn out and the program moves back to the step S11 so as to permit the setting of a new main key. Thus, this procedure is utilized when there is a mis-registration of the main key on the original line registration.

Figure 6:
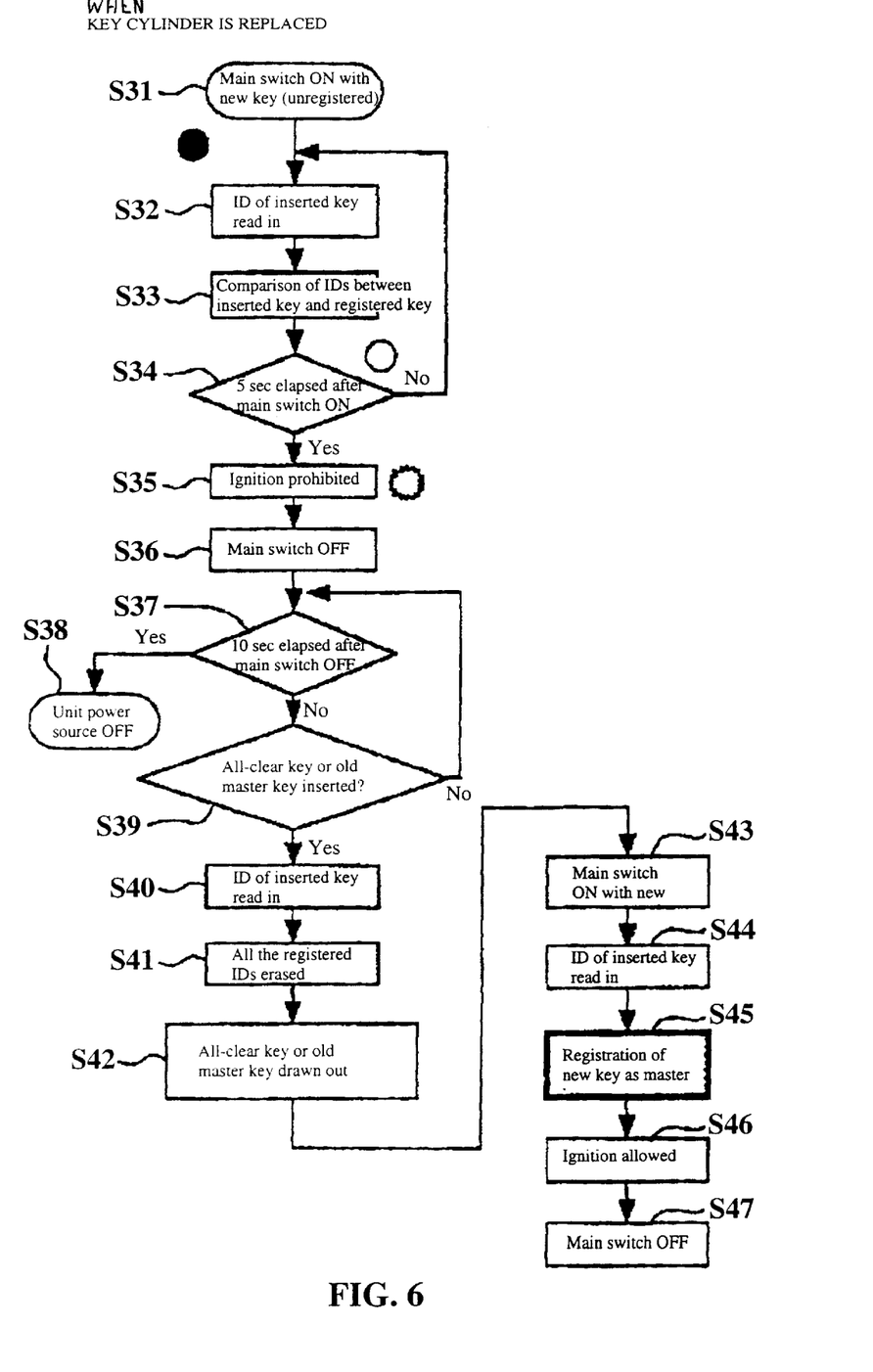
FIG. 6 is a flow diagram showing how the device re-registered a key for use as a master key when the key cylinder is replaced.

The routine for resetting the master key when the key cylinder 13 is replaced will now be described by particular reference to FIG. 6. The program begins at the step S31 which is initiated when the main switch is switched on with a new key that is not registered. Then at the step S32 the ID of the inserted key is read by receiving the transmission signal from the transponder 15 to the communication circuit and the ID reading circuit 18.

Then at the step S33 the ID of the inserted key is compared with the ID of the registered key or keys. The program then goes into a holding pattern where the timer sets a time interval of 5 seconds for after the main switch has been turned at the step S34 and an indication on the display 26 is given to indicate that the operation display section is illuminated continuously.

If the 5-second interval has not passed, the program repeats back to the step S32. If, however, at the step S34 it is determined that the 5 second delay has run, then the program moves to the step S35 to prevent operation of the prime mover and the flashing light is turned on a relatively slow interval, such as 2 seconds.

Then, if the main switch is turned off and the new key has been removed, at the step S36, the program moves to the step S37 to determine if a 10 second time interval has elapsed after the main switch 17 has been turned off. If it has been, the program moves to the step S38 and switches off the power source circuit 22.

If, however, the time limit for the 10 seconds has not run out at the step S37, the program moves to the step S39 to determine if an all clear key or an old master is inserted. If it has not been, the program repeats back to the step S37 and continues until either the time limit has run and then the power is switched off at the step S38 or the insertion of a new key is again checked at the step S39.

The program then moves to the step S49 if either the all-clear key or an old registered master key has been inserted where the ID of the inserted key is read in. Then the program moves to the step S41 so as to erase from the EEPROM 21 the ID codes of all registered IDs to be erased.

Then, at the step S42 either the all-clear key or the old master key that has been inserted is withdrawn. Then the program moves to the step S43 where a new key to be registered is inserted. This can be one of the sub-keys. When this new key is inserted, the program moves to the step S44 wherein the ID of the new key is read. The program then moves to the step S45 so as to register the new key as the master key. The program then moves to the step S46 wherein ignition is allowed and subsequently at the step S47 the main switch will be turned off and the program stops.

Figure 7:
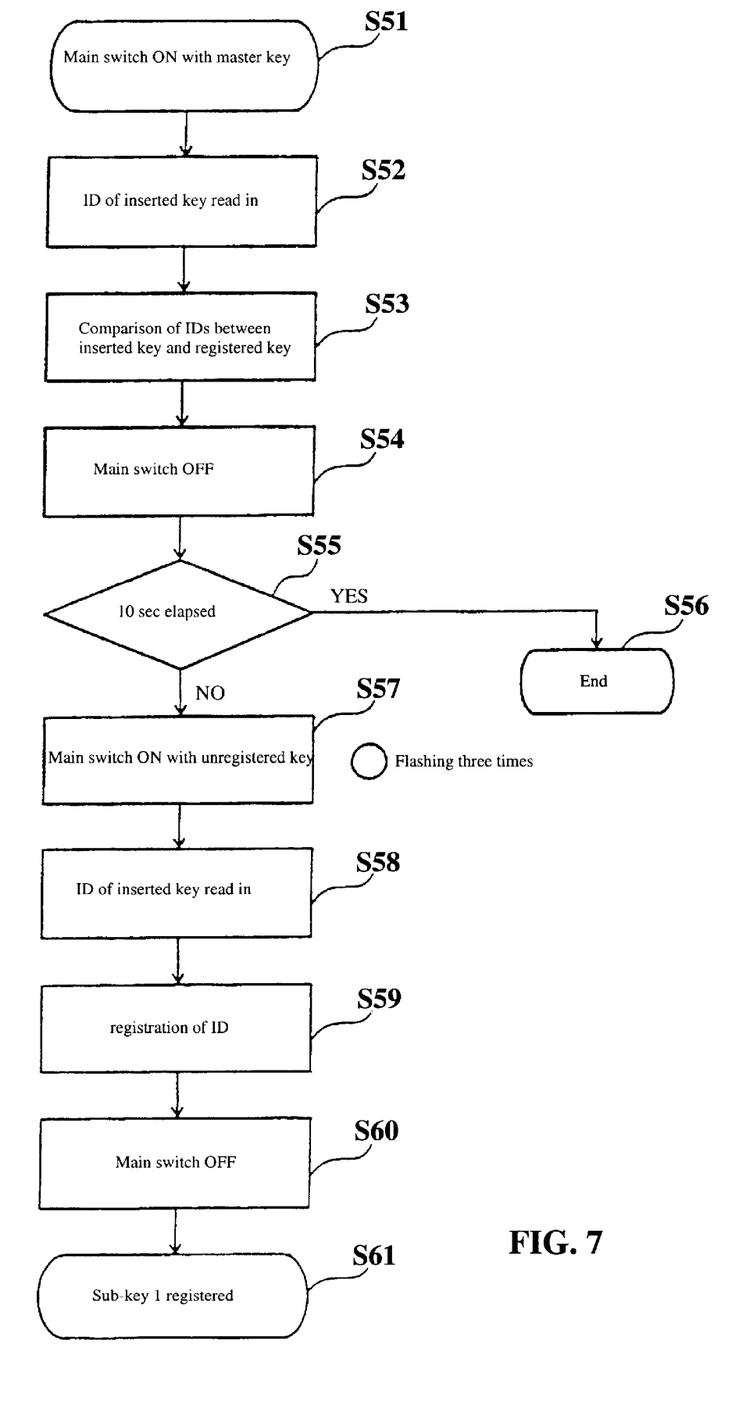
FIG. 7 is a view showing the procedure for registration of a sub-key.

FIG. 7 shows a procedure to be employed when a sub-key has been lost or not previously registered and it is desired to be registered. In this procedure, at the step S51, the main switch 13 and 17 are switched on by using the master key. The ID of the master key is then read at the step S52 by receiving the responder signal in the reading circuit 18.

Then at the step S53, the comparison between the registered key and the inserted key is compared to determine if the correct key has been inserted. If so, then the main switch is turned off at the step S54. The delay circuit of the self-holding circuit 33 of the master circuit 22 holds the main switch 17 on and the program moves to the step S55 so as to determine if 10 seconds have elapsed without the insertion of a new key.

If so, the program moves to the step S56 and the system shuts down. If, however, at the step S55, 10 seconds has not elapsed and it is determined at the step S57 that a new unregistered key has been inserted and switched on, then the indicator 34 flashes three times and at the step S58, the ID of the newly inserted key is read. This newly read ID is then registered at the step S59 on the EEPROM 21. The program then moves to the step S60 where the main switch is turned off and then at the step S61 the registration of the new key is confirmed and it has been registered.

The procedure for registering the second sub-key differs from the registration of the first sub-key only in that at the step S57, when the second key is registered, the three times flashing of the indicator is eliminated. In this way, it is possible to determine that both sub-keys have been registered and to discriminate between them.

At times, however, the second sub-key may not be initially registered or may in fact become lost after it has been registered. Thus, a new or previously unregistered sub-key may be registered. The procedure for doing this comprises turning the main switch on at the step S54 by inserting a properly pre-registered key and then off and withdrawing the already registered key without starting the prime mover.

Then, the new key to be registered is inserted and assuming that it is a proper sub-key to be registered (has a registered ID), then the procedure through the steps S55 through F61 can be repeated. The only difference from the previous registrations will be that the flashing that normally occurs at the step S57 will be deleted so as to indicate that a second registration of a sub-key is occurring. If, however, at the step S55 no proper registered sub-key has been inserted within the time period, the system will time out and it will not be possible to register a false key.

Figure 9:
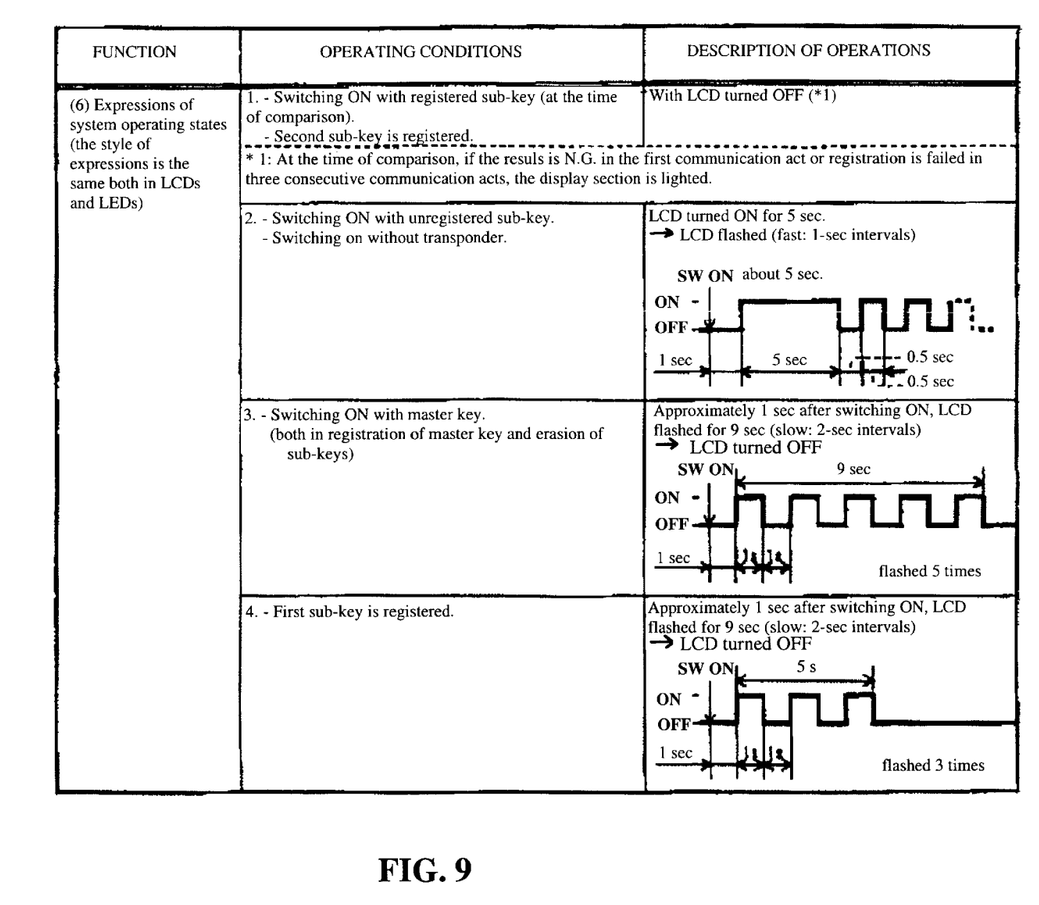

The tables of FIGS. 8 and 9 show the various conditions of operation and summarize what has been previously stated. Since these figures are really self-explanatory, it is not believed necessary to repeat their descriptions and those skilled in the art will readily understand how these procedures are accomplished and what is done during the procedures.

Thus, from the foregoing description, it should be readily apparent that a system has been disclosed and described that permits the setting of a new key and the register if all keys have been not initially registered or the updating of a system wherein the master switch is replaced and avoiding the necessity of creating a new key or modifying an existing key so as to match the ID of the new switch. Also, this permits the correction of mis-registrations without complicated procedures. Of course, the foregoing description is that of preferred embodiments of the invention and various changes and modifications may be made without departing from the spirit and scope of the invention, as defined by the appended claims.

What is claimed is:

1. A method of preventing vehicle thefts in a system having a key cylinder and a controller mounted on a vehicle and a key insertable in said key cylinder for switching on a main switch for activating a prime mover of the vehicle, the key having a built-in transponder containing an ID code of the key to be sensed when the key is inserted in the key cylinder by the controller, said method comprising the steps permitting operation of the prime mover only when the ID code detected by the transponder coincides with an ID code which has been registered in the controller, conditioning the controller to memorize an ID code of a newly recognized key by inserting a key having a specific ID code into the key cylinder to turn the main switch on and withdrawing the key having the specific ID code without starting the prime mover, and thereafter registering an ID code of the newly recognized key if inserted into the key cylinder within a predetermined time period.

2. A method of preventing vehicle thefts as set forth in claim 1 further including the step of erasing from a controller registry all ID codes before registering the ID code of the newly recognized key.

3. A method of preventing vehicle thefts as set forth in claim 2 wherein the newly registered key becomes a master key upon its registration.

4. A method of preventing vehicle thefts as set forth in claim 3 wherein the newly registered key comprises an old master key.

5. A method of preventing vehicle thefts as set forth in claim 2 the step of erasing from a controller registry all ID codes before registering the ID code of the newly recognized key is done by inserting a special key having a specific registered ID code inerasable as fixed data in the controller and for use in erasing all other ID codes.

6. A device for preventing vehicle thefts comprising a key cylinder and a controller mounted on a vehicle and a key insertable in said key cylinder for switching on a main switch for activating a prime mover of the vehicle, said key having a built-in transponder containing an ID code of the key to be sensed when said key is inserted in said key cylinder by said controller, said controller permitting operation of the prime mover only when the ID code detected by said transponder coincides with an ID code which has been registered in the controller, said controller memorizing an ID code of a newly recognized key when a key having a specific ID code is inserted into said key cylinder to turn said main switch on and withdrawing the key having a the specific ID code without starting the prime mover, and registering an ID code of the newly recognized key if inserted into the key cylinder within a predetermined time period.

7. A device for preventing vehicle thefts as set forth in claim 6 wherein all ID codes are erased from the controller registry before registering the ID code of the newly recognized key.

8. A device for preventing vehicle thefts as set forth in claim 7 wherein the newly registered key becomes a master key upon its registration.

9. A device for preventing vehicle thefts as set forth in claim 8 wherein the newly registered key comprises an old master key.

10. A device for preventing vehicle thefts as set forth in claim 7 wherein erasing from a controller registry all ID codes before registering the ID code of the newly recognized key is done by inserting a special key having a specific registered ID code inerasable as fixed data in the controller for erasing all other ID codes.

* * * * *